US009932857B2

United States Patent
Noel et al.

(10) Patent No.: US 9,932,857 B2
(45) Date of Patent: Apr. 3, 2018

(54) BEARING HOLDER HAVING A AXISYMMETRIC SEALABLE GIMLET

(71) Applicant: SNECMA, Paris (FR)

(72) Inventors: Frederic Noel, Moissy-Cramayel (FR); Benoit Argemiro Matthieu Debray, Moissy-Cramayel (FR); Mario Cesar De Sousa, Moissy-Cramayel (FR); Gregory Ghosarossian-Prillieux, Moissy-Cramayel (FR); Nicolas Pommier, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 15/037,642

(22) PCT Filed: Nov. 18, 2014

(86) PCT No.: PCT/FR2014/052952
§ 371 (c)(1),
(2) Date: May 18, 2016

(87) PCT Pub. No.: WO2015/075371
PCT Pub. Date: May 28, 2015

(65) Prior Publication Data
US 2016/0281534 A1    Sep. 29, 2016

(30) Foreign Application Priority Data

Nov. 20, 2013   (FR) ...................................... 13 61418
Dec. 5, 2013    (FR) ...................................... 13 62184

(51) Int. Cl.
F01D 25/16        (2006.01)
F02C 7/06         (2006.01)
(Continued)

(52) U.S. Cl.
CPC ........... *F01D 25/162* (2013.01); *F01D 25/18* (2013.01); *F02C 7/06* (2013.01); *F16C 33/76* (2013.01);
(Continued)

(58) Field of Classification Search
CPC ..... F16C 33/76; F16C 33/7816; F16C 35/045; F16C 35/067; F01D 25/162; F01D 25/164;
(Continued)

(56) References Cited

U.S. PATENT DOCUMENTS 9,234,439 B2 *   1/2016   Demitraszek, Sr. .... F01D 25/16
2004/0057847 A1  3/2004   Wild
(Continued)

FOREIGN PATENT DOCUMENTS

CN    1493771 A    5/2004
CN    1900508 A    1/2007
(Continued)

OTHER PUBLICATIONS

First Office Action in Chinese Application No. 201480063455.6 dated Nov. 28, 2016. 3 pages.
(Continued)

*Primary Examiner* — James Pilkington
(74) *Attorney, Agent, or Firm* — Womble Bond Dickinson (US) LLP

(57) ABSTRACT

A bypass engine bearing holder (1) that holds an upstream bearing (6) and defines, with said upstream bearing, an oil chamber (100) and an air chamber (200), comprising a frusto-conical portion (11) defining an upstream bearing chamber (160) and a downstream inner chamber (150), and includes an outer collar (13) connected, by a weld (135), to a flange (15) that extends outward from the frusto-conical portion (11). The outer collar (13) has a sealable gimlet (131) engaging with the upstream bearing (6) such as to seal the oil chamber (100). The bearing holder (1) includes a plurality of oil recovery ducts (8) leading to the downstream inner chamber (150) and to the upstream bearing chamber (160). The oil recovery ducts (8) lead to the upstream
(Continued)

bearing chamber (160), downstream from the weld (135) of the outer collar (13) on the flange (15), the weld (135) of the outer collar (13) being axisymmetric.

10 Claims, 3 Drawing Sheets

(51) Int. Cl.
*F01D 25/18* (2006.01)
*F16C 33/76* (2006.01)
*F16C 35/04* (2006.01)
*F16C 35/067* (2006.01)

(52) U.S. Cl.
CPC .......... *F16C 35/045* (2013.01); *F16C 35/067* (2013.01); *F05D 2220/323* (2013.01); *F05D 2230/232* (2013.01); *F05D 2240/50* (2013.01)

(58) Field of Classification Search
CPC .......... F01D 25/18; F01D 25/183; F02C 7/06; F05D 2220/323; F05D 2230/232; F05D 2240/50; F05D 2240/54
See application file for complete search history.

(56) References Cited

U.S. PATENT DOCUMENTS

| | | |
|---|---|---|
| 2006/0272314 A1 | 12/2006 | Moniz et al. |
| 2013/0183142 A1 | 7/2013 | Durand et al. |
| 2015/0139785 A1* | 5/2015 | Noel ................ F16C 33/76 |
| | | 415/116 |
| 2015/0285098 A1* | 10/2015 | De Sousa .............. F01D 9/04 |
| | | 415/214.1 |

FOREIGN PATENT DOCUMENTS

| | | |
|---|---|---|
| CN | 202280830 U | 6/2012 |
| EP | 0 852 286 A2 | 7/1998 |
| EP | 1 731 733 A2 | 12/2006 |
| FR | 2 752 024 A1 | 2/1998 |

OTHER PUBLICATIONS

Search Report in French Application No. 1361418 dated Jul. 29, 2014, with English translation coversheet. 3 pages.
International Search Report in PCT/FR2014/052952 dated Jan. 28, 2015. 2 pages.

* cited by examiner

BEARING HOLDER HAVING A AXISYMMETRIC SEALABLE GIMLET

FIELD OF THE INVENTION

The present invention relates to bearing supports for a turbomachine such as a turbojet.

STATE OF THE ART

A turbomachine includes, from upstream to downstream in the gas flow direction, a compressor, a combustion chamber and a turbine. The role of the compressor is to increase the pressure of the air supplied to the combustion chamber. The role of the turbine is to provide for driving the compressor in rotation by tapping a portion of the pressure energy of the hot gases leaving the combustion chamber and transforming it into mechanical energy. The compressor and the turbine consist of a first set of fixed parts constituting the stator and a second set of parts, capable of being put into rotation with respect to the stator, constituting the rotor. The rotor of the compressor and the rotor of the turbine form an assembly integrally linked by a rotating shaft. The rotation of the rotor with respect to the stator is made possible by means of an upstream bearing and a downstream bearing, a bearing being a mechanical member supporting and guiding a rotor, in particular the shaft 2 of the rotor. The upstream and downstream bearings include a first portion attached to the rotor shaft and a second portion attached to the stator by means of a bearing support. A rolling-contact bearing element is positioned between the two portions of the bearing, thus allowing rotation of a portion of the bearing with respect to the other. The rolling-contact bearing element is of the ball type, the cylindrical roller type or the conical roller type for example.

The bearing support supports the upstream and downstream bearings and participates in centering the rotor. A turbojet bearing support has a plurality of oil recovery ducts. The oil recovery ducts allow ventilation and balancing of the pressures in the oil chamber. They supply the bearing with oil and also allow recovery of the excess oil accumulated in the chamber, in the event of a sharp tilting of the engine.

It is also known to use a sealable gimlet welded to the bearing support and cooperating with the upstream bearing for sealing the oil chamber. The oil recovery ducts then form an oil recovery hump at the gimlet seal. The weld between the gimlet seal and the bearing support is not axisymmetric and requires manual welding, which prevents the industrial production of such bearing supports.

PRESENTATION OF THE INVENTION

The invention makes it possible to compensate for at least one of the aforementioned shortcomings by proposing a turbojet bearing support having a geometry of the gimlet seal and of oil recovery ducts allowing manual welding of the gimlet seal to the rest of the bearing support.

To this end, the invention proposes a turbomachine, particularly a turbojet bearing support, supporting an upstream bearing and defining with it an oil chamber and an air chamber, the bearing support including a frusto-conical portion defining an upstream bearing chamber and a downstream internal chamber, the bearing support further including an outer ferrule connected by a weld to a flange extending to the outside from the frusto-conical portion, the outer ferrule bearing a gimlet seal cooperating with the upstream bearing for sealing the oil chamber, the bearing support further including a plurality of oil recovery ducts leading, on one side, to the downstream inner chamber and, on the other side, to the upstream bearing chamber, the bearing support being characterized in that the oil recovery ducts lead to the upstream bearing chamber downstream of the weld of the outer ferrule to the flange and in that the weld of the outer ferrule is axisymmetric.

Such a bearing support has the advantage of being more easily produced industrially thanks in particular to the axisymmetric weld which can be accomplished automatically, unlike the non-axisymmetric welds which the bearing supports of the prior art had.

The invention is advantageously complemented by the following features, taken individually or in any one of their technically possible combinations:
- the oil recovery ducts protrude externally radially from the frusto-conical portion;
- the oil recovery ducts each have a cross-section with a shape substantially from among the rectangular, circular and oval shapes;
- the bearing support includes three oil recovery ducts;
- the oil recovery ducts are regularly distributed angularly;
- the oil recovery ducts each have a cross-section with a shape substantially from among the rectangular, circular and oval shapes;
- the frusto-conical portion has a diameter than increases downstream from the upstream bearing;
- the bearing support further includes a flange portion which extends from the frusto-conical portion to the downstream bearing;
- the flange portion is frusto-conical, its diameter decreasing downstream;
- the flange portion further has an internal radial flange at its downstream end, the inner radial flange connecting the flange portion to an oil intake cover.

The invention also relates to a turbomachine including a bearing support as described above.

DESCRIPTION OF THE FIGURES

Other aims, features and advantages will be revealed by the detailed description with follows with reference to the drawings, given by way of illustration and not limiting, among which.

Figure 3:
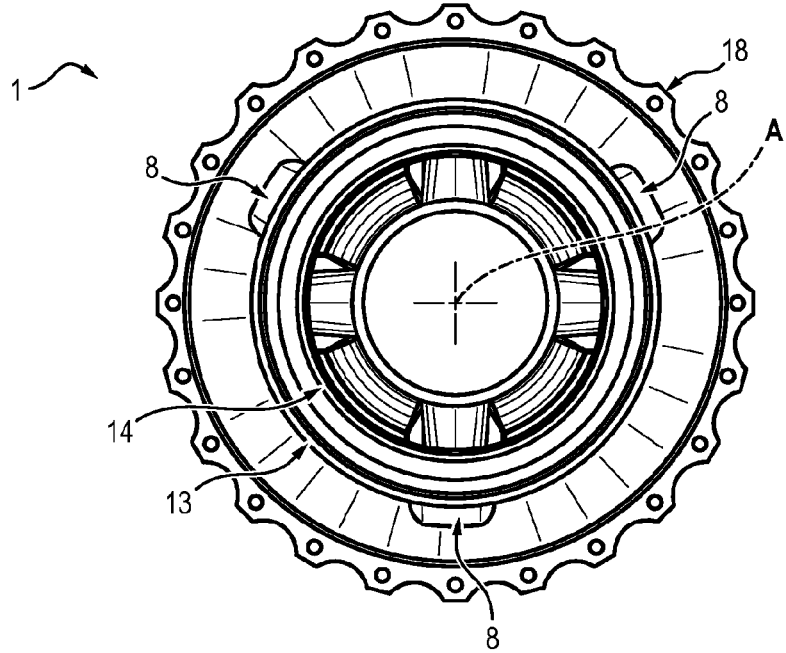
FIGS. 3 to 5 are respectively views from in front, from below (azimuth angle 6 hours) and from above (azimuth angle 12 hours) of an example of a bearing support conforming to the invention.
Figure 4:
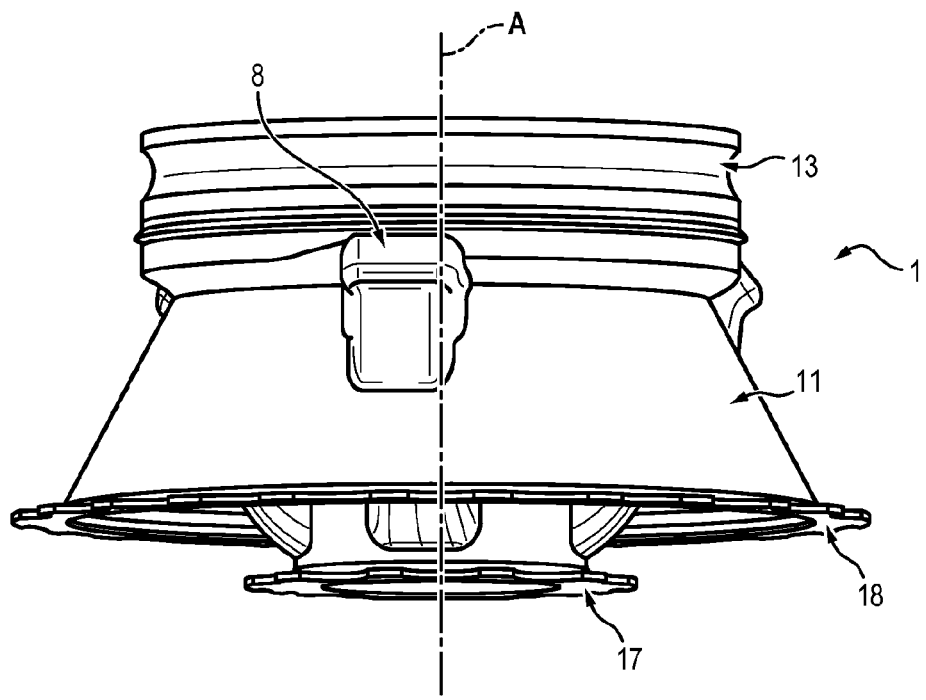
Figure 5:
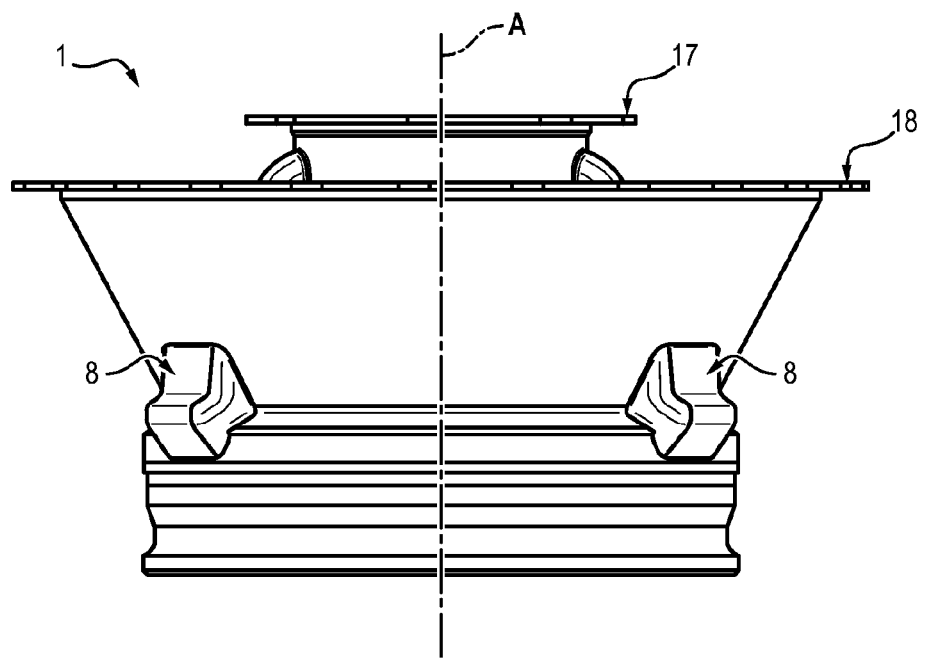

It will be noted that FIGS. 4 and 5 illustrate respectively the lower and upper portions of the bearing support, that is the portions situated within an azimuth angle in proximity respectively to 6 hours and 12 hours in the bearing support plane of FIG. 3. The angle in this plane is defined by reference to a clock dial.

DETAILED DESCRIPTION OF THE INVENTION

Figure 1:
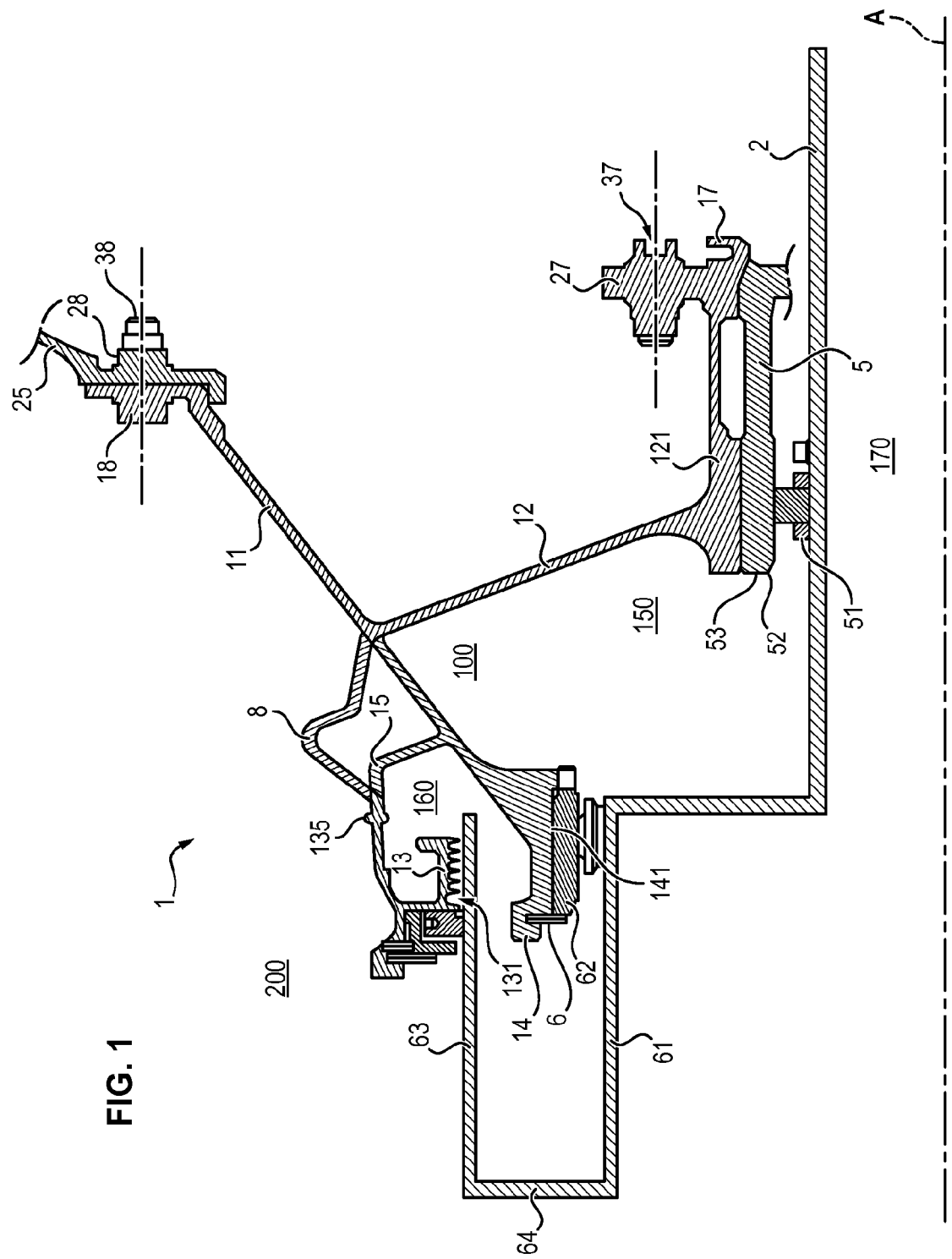
FIG. 1 is a radial half-section of an example of a bearing support conforming to the invention, at an oil recovery duct.
Figure 2:
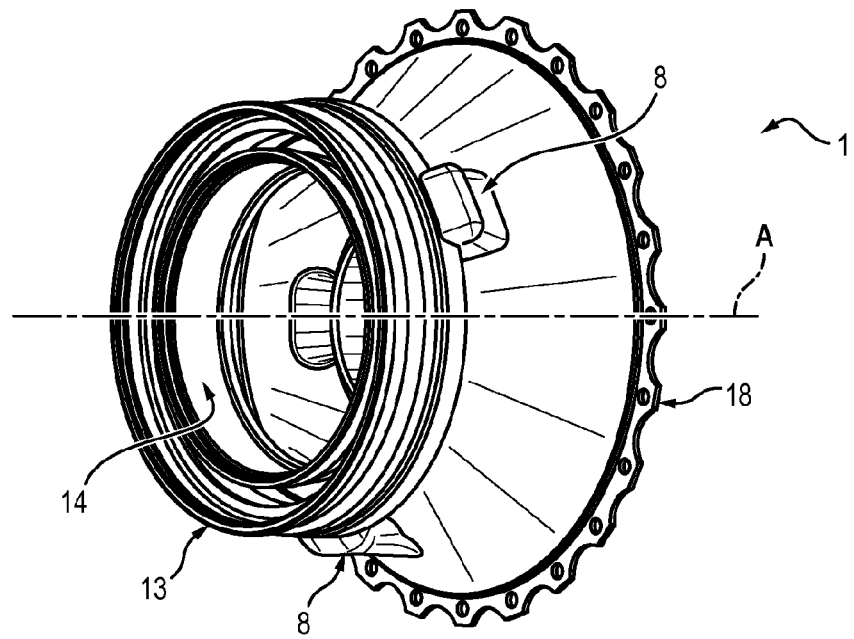
FIG. 2 is a perspective view of a bearing support conforming to the invention.

Referring to FIGS. 1 and 2, a shaft 2 is guided in rotation along the geometric axis A and positioned in translation by an upstream bearing 6 integral with an exhaust casing 25 of the turbomachine by means of a bearing support 1. This upstream bearing 6 is positioned just vertically below a stage of the low-pressure turbine. The shaft 2 is also guided at the rear of the turbomachine by a downstream bearing 5, also integral with the casing 25, by means of a bearing support 1. The bearing support 1 defines, with the upstream bearing 6 and the downstream bearing 5, an oil chamber 100 and an air chamber 200.

Referring to FIGS. 1 and 2, the bearing support 1 is a part having symmetry about the axis A of the turbojet. The bearing support 1 has a frusto-conical portion 11 which extends downstream while widening, starting from the upstream bearing 6. The bearing support 1 further has a flange portion 12 which extends from the midpoint of the frusto-conical portion up to the downstream bearing 5. The flange portion 12 is frusto-conical, its diameter decreasing downstream. The frusto-conical portion 11 is extended upstream by an inner ferrule 14. The inner ferrule 14 extends axially parallel to the axis A of the turbojet from the upstream end of the frusto-conical portion 11. The frusto-conical portion 11 defines by its external space an upstream bearing chamber 160 and by its internal space a downstream inner chamber 150.

The downstream bearing 5 includes an internal ring 51 and an external ring 52, between which are mounted rollers or other rolling members. The inner ring 51 is mounted integrally with the compressor shaft 2 and the outer ring 52 is mounted integrally with the casing 25 of the turbojet 1.

The upstream bearing 6 includes an inner ring 61 and an outer ring 62, between which are mounted balls or other rolling members. The inner ring 61 is connected integrally with the shaft 2 and the outer ring 62 is integral with the bearing support 1 and more precisely with the inner ferrule 14 of the bearing support 1. The balls allow rotation of the inner ring 61 with respect to the outer ring 62, and thus to the bearing support 1. The shaft 2 further comprises an outer arm 63 extending an attachment flange 64.

The outer ring 52 of the downstream bearing 5 is connected, by its outer face, to an intermediate flange 53 attached to the bearing support 1 on an outer flange 121. The latter forms the inner edge of a flange portion 12 of the bearing support 1, positioned substantially axially parallel to the axis A of the turbomachine.

The outer ring 62 of the upstream bearing 6 is connected, by its outer face, to a connecting part 141 attached to the bearing support 1. The connecting part 141 forms the inner edge of the inner ferrule 14 of the bearing support 1 and extend substantially axially parallel to the axis A of the turbomachine.

A flange 15 extends substantially radially inside from a point of the frusto-conical portion 11 located downstream of the upstream end of the frusto-conical portion 11. An outer ferrule 13 is welded to a weld point 135 on this flange 15. The outer ferrule 13 faces the inner ferrule 14. The outer ferrule 13 has an inner surface facing the outer surface of the inner ferrule 14 including a gimlet seal 131. The latter cooperates with the outer arm 63 of the shaft 2 to form a sealing system provided for sealing the oil chamber 100. A flow of air can be introduced into the existing space between the gimlet seal 131 and the outer arm 63 of the shaft 2 and be driven by the shaft in rotation under the influence of friction and thus drive the oil which has a tendency to penetrate into the existing space between the gimlet seal 131 and the upstream bearing 6, so that the air current generated drives the oil into the oil chamber 100. The diameter of the outer ferrule 14 is on the order of 190 mm.

The frusto-conical portion 11 of the bearing support 1 has an outer radial flange 18 at its downstream end. The outer radial flange 18 connects the bearing support to the casing 25, for example by means of bolts 38 passing through the openings 28 provided on the outer radial flange 18. The flange portion 12 of the bearing support 1 further has an inner radial flange 17 at its downstream end. The inner radial flange 17 is attached to an oil intake cover (not shown) for example by bolts 37 passing through openings 27 provided on the inner radial flange 17.

With reference particularly to FIGS. 3 to 5, the bearing support 1 includes a plurality of oil recovery ducts 8 leading on one side to the upstream bearing chamber 160 downstream of the weld 135 and on the other side to the downstream inner chamber 150. These oil recovery ducts 8 protrude from the frusto-conical portion 11. The bearing support 1 advantageously includes three oil recover ducts 8 regularly distributed angularly at 180° from each other on the axis A, radially outside on the perimeter of the frusto-conical portion 11. One of the ducts 8 is positioned at an azimuth angle of 6 hours. The cross-section of each of the three oil recovery ducts 8 is substantially of a shape from among the rectangular, circular and oval shapes.

The sum of the cross-sections of each duct corresponds to the minimum cross-section allowing passage of the oil. In the case of a sharp tilting of the engine, the oil recovery ducts 8 allow recovery of the excess oil accumulated in the downstream inner chamber 150 and supply oil to the upstream bearing 6. The oil recovery ducts 8 further allow ventilation and balancing of the pressures in the oil chamber 100.

The bearing support 1 has the advantage of not having an oil recovery hump at the weld point 135, because the oil recovery duct 8 is placed downstream of the weld point 135. The weld 135 can thus become axisymmetric, which facilitates its implementation using a robot arm for example. The sealing function of the gimlet seal 131 is dissociated from the oil recovery duct 8.

The bearing support 1 can be manufactured by a foundry manufacturing process and has a smaller mass at the bearing support than the prior art.

The bearing support 1 satisfies the requirements of mechanical dimensioning in its environment and particularly the exhaust casing and the rotor. In particular, it is designed to maintain the criteria of mechanical strength in event of an engine failure. The bearing support 1 is designed to avoid dynamic resonance of the gimlet seal over the engine's range of operation and to satisfy clearances with parts located in the close environment. The bearing support 1 can be produced industrially due in particular to its axisymmetric weld.

The invention claimed is:

1. A turbomachine bearing support supporting an upstream bearing and defining with said upstream bearing an oil chamber and an air chamber,
the bearing support comprising a frusto-conical portion extending into the oil chamber to define an upstream bearing chamber and a downstream inner chamber,
the bearing support further comprising an outer ferrule connected by a weld to a flange extending outside from the frusto-conical portion, the outer ferrule bearing a gimlet seal cooperating with the upstream bearing for sealing the oil chamber,
the bearing support further including a plurality of oil recovery ducts leading on one side to the downstream inner chamber and on the other side to the upstream bearing chamber,
the bearing support being characterized in that the oil recovery ducts lead to the upstream bearing chamber downstream of the weld of the outer ferrule to the flange and in that the weld of the outer ferrule is axisymmetric with respect to an axis (A) of the turbomachine.

2. The bearing support according to claim 1, wherein the oil recovery ducts protrude radially outward from the frusto-conical portion.

3. The bearing support according to claim 1, including three oil recovery ducts.

4. The bearing support according to claim 1, wherein the oil recovery ducts are regularly distributed around a circumference of the bearing support.

5. The bearing support according to claim 1, wherein the oil recovery ducts each have a sectional shape selected from rectangular, circular or oval.

6. The bearing support according to claim 1, wherein the frusto-conical portion has a diameter which increases downstream starting at the upstream bearing.

7. The bearing support according to claim 1, further including a second flange which extends from the frusto-conical portion to the downstream bearing.

8. The bearing support according to claim 7, wherein the second flange has a frusto-conical shape, the diameter of the second flange decreasing downstream.

9. The bearing support according to claim 7, wherein the second flange has an inner radial flange at its downstream end, the inner radial flange connecting the flange portion to an oil intake cover.

10. A turbomachine comprising a bearing support according to claim 1.

* * * * *